United States Patent [19]

Schmitt

[11] Patent Number: 5,037,559

[45] Date of Patent: Aug. 6, 1991

[54] PROCESS FOR CONDITIONING AND DEWATERING SLUDGES

[75] Inventor: Wälti Schmitt, Bad Schwalbach, Fed. Rep. of Germany

[73] Assignee: Passavant-Werke AG, Fed. Rep. of Germany

[21] Appl. No.: 456,619

[22] Filed: Dec. 28, 1989

Related U.S. Application Data

[63] Continuation of Ser. No. 136,275, Dec. 22, 1987, abandoned.

[30] Foreign Application Priority Data

Dec. 22, 1986 [DE] Fed. Rep. of Germany ....... 3644070

[51] Int. Cl.$^5$ .............................................. C02F 11/14
[52] U.S. Cl. .................................. 210/709; 210/745; 210/96.1; 73/64.1; 356/394
[58] Field of Search ...................... 210/709, 745, 96.1, 210/609, 808, 143; 73/64.1; 356/338, 394, 397, 433, 442

[56] References Cited

U.S. PATENT DOCUMENTS

| | | | |
|---|---|---|---|
| 3,605,775 | 9/1971 | Zaander | 210/745 X |
| 3,858,851 | 1/1975 | Ogle | 356/102 |
| 4,178,243 | 12/1979 | Messer | 210/709 |
| 4,345,996 | 8/1982 | Lindman et al. | 210/96.1 |
| 4,544,489 | 10/1985 | Campbell et al. | 210/709 |
| 4,628,204 | 12/1986 | Maes | 210/745 X |
| 4,731,176 | 3/1988 | Macdonald | 210/745 X |
| 4,861,492 | 8/1989 | Lehmkuhl et al. | 210/745 |
| 4,976,871 | 12/1990 | Banks et al. | 210/709 |

FOREIGN PATENT DOCUMENTS

| | | |
|---|---|---|
| 2022752 | 2/1974 | Fed. Rep. of Germany . |
| 2320212 | 11/1974 | Fed. Rep. of Germany . |
| 2431107 | 1/1975 | Fed. Rep. of Germany . |
| 3143825 | 5/1983 | Fed. Rep. of Germany . |
| 3241678 | 5/1984 | Fed. Rep. of Germany . |
| 3438798 | 4/1986 | Fed. Rep. of Germany . |

Primary Examiner—Tom Wyse
Attorney, Agent, or Firm—Larson and Taylor

[57] ABSTRACT

During conditioning of a suspension to be dewatered through incorporation of flocculant, the optimum dewaterability depends on the amount of added flocculant and on the mixing energy expended. According to the invention, the sludge flocs present or formed in the suspension after incorporation of the flocculant are determined metrologically, and the amount of flocculant and/or the mixing energy expended and/or the location of flocculant addition is controlled as a function of the floc number, size and/or structure.

7 Claims, 2 Drawing Sheets

PROCESS FOR CONDITIONING AND DEWATERING SLUDGES

This application is a continuation of application Ser. No. 07/136,275 filed Dec. 22, 1987, now abandoned.

The invention relates to a process for conditioning and dewatering sludges which includes the addition of flocculant.

Flocculants here are generally taken to mean all agents which favourably influence flocculation and/or the size, stability and dewaterability of the flocs formed. These include, in particular, true flocculants, which cause flocculation of dissolved or colloidal constituents, and so-called flocculation aids, which favour agglomeration and solidification of the flocs. The preferred area of application of the invention is in sludge conditioning through addition of flocculation aids in the form of organic polymer compounds, so-called polyelectrolytes.

It is known that, depending on the particular application, the dewatering apparatus used and the like, a certain ratio by weight of flocculant to the solids content of the sludge is necessary in order to achieve optimum dewaterability, and that using less flocculant than the optimum amount leads to inadequate dewaterability, and using more leads to unnecessarily high consumption of flocculant. The optimum amount can be determined by trial experiments, for example using the Becher sedimentation test or alternatively using a test apparatus having a tubular mixing section and a turbidimeter (German Offenlegungsschrift No. 3,143,825), and then set on the conditioning plant. However, both the flow rate and the solids content (its sludge solids SS) can vary considerably in practice. A process of the type mentioned initially is therefore known in which the addition of flocculant is controlled with reference to the SS material stream measured upstream of the addition point (Abwassertechnik, Issue 1/1965, pp. 4 and 5), it also being possible to determine the solids content of the sludge, for example, by means of optical turbidity measurement (German Auslegeschrift No. 2,022,752).

In this known process, however, it is not taken into account that the optimum flocculant addition rate is not dependent only on the amount and solids content of the sludge, but also on other parameters, in particular the nature of the sludge (e.g. whether activated sludge, digested sludge, flocculant sludge, etc.). In addition, the previously known processes do not allow, besides or in place of the addition rate, other conditioning parameters to be adjusted. Thus, for example, it is known that the type and energy expended for mixing the flocculant with the sludge and also the choice of point of addition on the vacuum or pressure side of a pump producing the filtration pressure (Abwassertechnik, Issue 1/1985, p. 5) affect the conditioning result. However, specific matching of these parameters to the nature of the sludge to be conditioned in each case was hitherto unknown and not possible.

The invention has the object of improving a process of the type specified so that one or more flocculant-addition parameters can be controlled or regulated as a function of the conditioning result, to be precise in the sense of optimization to optimum dewaterability of the conditioned sludge at the lowest possible flocculant addition rate.

The solution of the object is given in claim 1. The subclaims indicate advantageous further features of the process according to the invention.

The invention utilizes the knowledge that the nature and size of the sludge flocs formed as the result of conditioning are on the one hand a direct indicator of the dewaterability achieved for the sludge and on the other hand can be influenced directly by the conditioning parameters (amount of flocculant, incorporation energy and nature of addition). The floc size and/or structure determined by means of an optical sludge probe can therefore be used as an actuating variable for regulating the conditioning parameters.

The invention furthermore takes into account the knowledge that it is not necessarily the largest sludge flocs which indicate optimum dewaterability. Excessively large flocs are frequently not sufficiently stable and are destroyed under the filtration pressure. However, it has been determined through experiments that a certain floc size which guarantees optimum dewaterability can in each case be indicated or determined by series of experiments specific to the sludge, i.e. for the various sludge types, such as activated sludge, digested sludge etc. When carrying out the process according to the invention, these optimum floc sizes which have previously been determined for the typical sludge types to be expected, or the measured signals from the optical sludge probe which correspond to these sizes, can be available in stored form as nominal values; during operation, the current measured signal from the optical sludge probe is compared with the nominal value belonging to the sludge type present, and the conditioning parameter(s) is (are) adjusted correspondingly. In this process, a procedure can be followed in which in each case only one parameter, for example the amount of flocculant, is adjusted within a limited range and the procedure is then switched to adjustment of another parameter, for example the incorporation energy, if adequate improvement in the floc size is not achieved within this range. All these operations can preferably be controlled by a correspondingly programmed process computer.

An embodiment of the invention is described in greater detail with reference to the drawings, in which.

Figure 1:
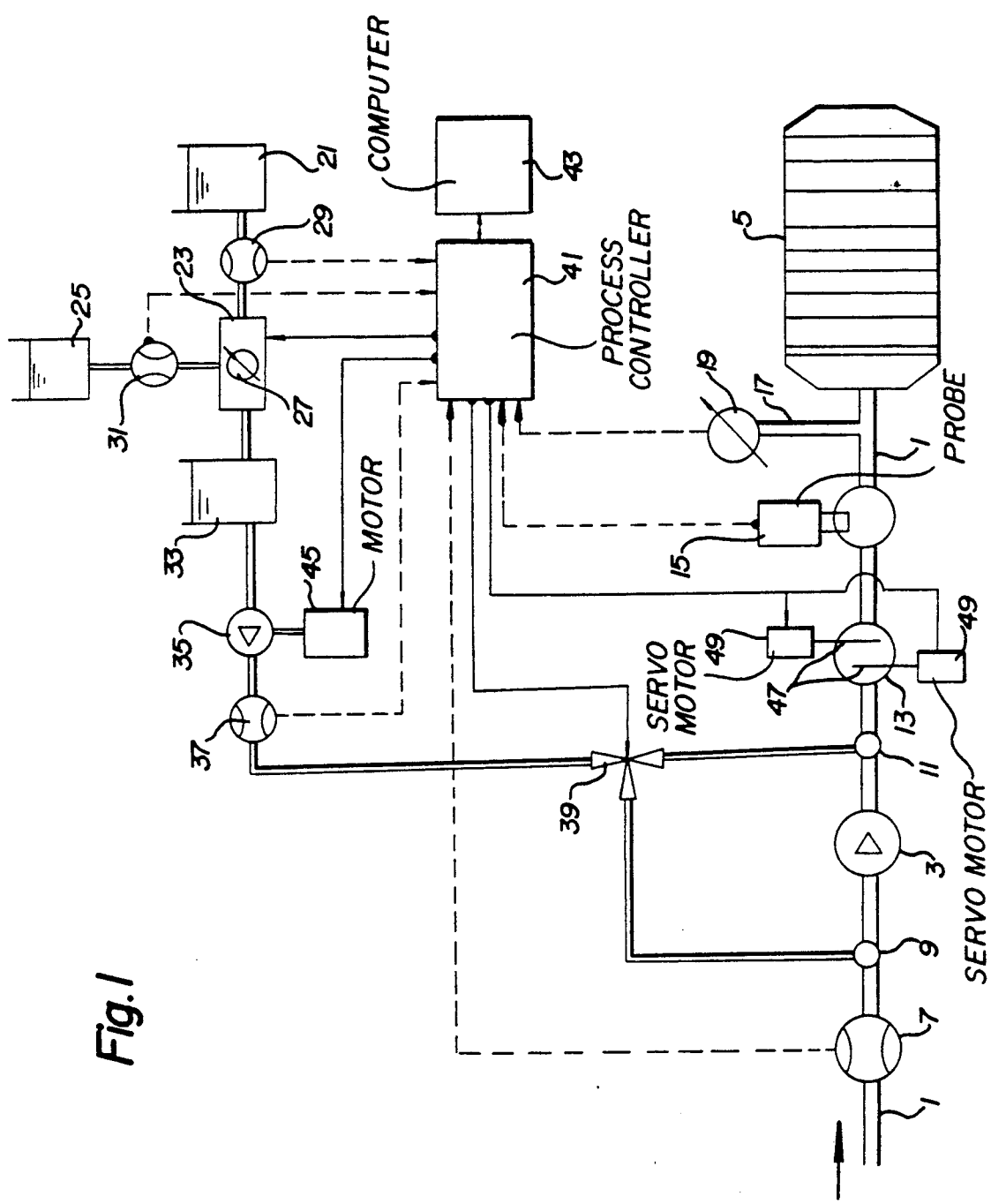
FIG. 1 shows a flow chart of a plant for carrying out the process according to the invention.

According to FIG. 1, a suspension to be dewatered is fed through a line 1 by means of a pump 3 to a dewatering device in the form of a filter press 5, the pump 3 producing the filtration pressure. A flow meter 7, flocculant addition points 9 and 11 arranged upstream and downstream of the pump respectively, a static turbulence mixer 13, a sludge measurement probe 15 and a branch 17 to a pressure gauge 19, by means of which the static pressure prevailing at the inlet to the filter press 5 can be measured, are furthermore arranged in the line 1.

In a flocculant container 21, a flocculant solution is stocked which is prepared by mixing water and the particular flocculant, preferably an organic polymer compound, in the container 21 or in an upstream flocculant mixing station, in particular at a flocculant concentration which is greater than the concentration required for the addition to the suspension. It is advantageous for the flocculant solution in the container 21 to have a residence time which is sufficient for maturing. The flocculant solution is diluted in a dilution station 23 by addition of water from the container 25 to give a ready-to-use solution having a flocculant concentration of, for example, 0.1 to 0.2%, it being possible to control the dilution ratio by a controllable mixing valve 27. The flow rates of the flocculant solution and water can each be constantly monitored by flow meters 29 and 31. The ready-to-use solution is stocked in the stock container 33 and fed to one of the two addition points 9 or 11 on the vacuum or pressure side of the pump 3 via a controllable metering pump 35 and a further flow meter 37 and also a switchable three-way valve 39.

Signal lines emanate at least from the flow meters 7 and 37, the sludge measuring probe 15 and the pressure gauge 19, and also possibly from the flow meters 29 and 31, to a central signal processor and controller 41, which is connected to a process computer 43, which may also be equipped with monitor, printer and similar conventional devices. The signal processor and controller 41 produces control signals for the mixing valve 27, the drive motor 45 of the metering pump 35, the switching valve 39 and the turbulence mixer 13.

The turbulence mixer 13 has at least one, preferably two, baffles 47 which are displaced by 180°, have turbulence-producing stalled edges and can be inserted to varying extents into the suspension stream by means of appropriate servomotors 49 and thereby produce turbulence of varying intensity for thorough incorporation of the flocculant fed into the suspension at 9 or 11. Depending on the setting of the baffles 47, a varying amount of incorporation energy is consumed and must be supplied by the pump 3. This type of turbulence incorporation of chemicals, for example into sewage, by means of turbulence-producing chicanes is known, for example, from German Offenlegungsschrift No. 2,320,212, but without the possibility of regulating the incorporation energy by adjusting the baffles.

The optical sludge probe 15 is primarily intended to determine the size and shape of the sludge flocs present after flocculant incorporation. It is therefore arranged at a distance from a turbulence mixture 13 such that the suspension travels this distance in a time which represents the optimum reaction and maturing time for flocculation. In particular, the sludge probe 15 can also be arranged immediately at the inlet to the filter press 5.

Figure 2:
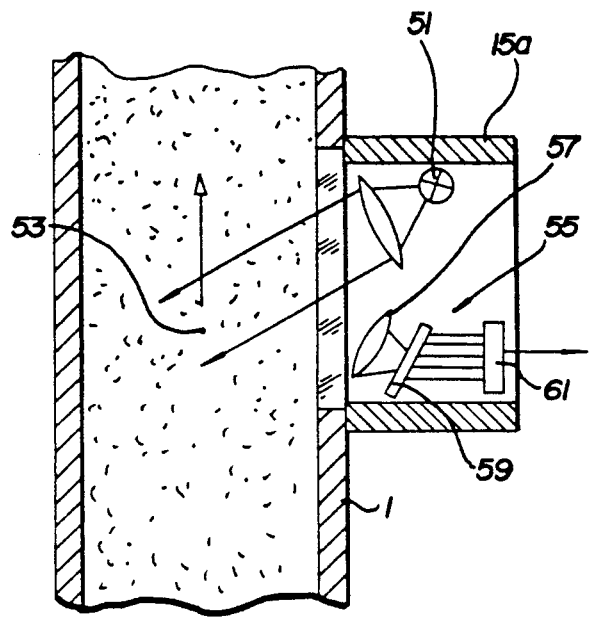
FIG. 2 shows a schematic view of a floc measuring device which can be used in the process.

FIG. 2 shows an example of an optical sludge probe which can be used according to the invention. It works on the principle of optically measuring scattered light. A measuring head 15a is inserted into the wall of the suspension line 1. It contains a light source 51, for example in the form of an incandescent lamp or alternatively a light diode, a laser or the like. The light source generates a light bundle 53 which is directed into the suspension stream and is focused by means of an optical system. An optical detector 55 is arranged so that it receives light from the light bundle 53 which has been reflected from or scattered by the sludge flocs. The detector 55 comprises an image-formation lens or optical system 57 and a receiver 59, in the form of a matrix of light-sensitive pixels, which is arranged in the image plane of the former. The pixels can be arranged in the form of separate sensors, with the use of a CCD (charge coupled device) surface-array sensor whose pixels are sensors designed in integrated semiconductor technique being advantageous. The individual pixels are connected to the signal processor and controller 41 of FIG. 1 (or to a separate computer which is used only for image analysis) via an interface circuit 61. Image analysers having CCD surface-array sensors are commercially available. Since each pixel can record a relatively large number (up to 256) grey tones, information on the number, size and/or structure of the sludge flocs illuminated by the light source 51 can be obtained from the distribution of the grey tones over the pixel matrix.

Figure 3:
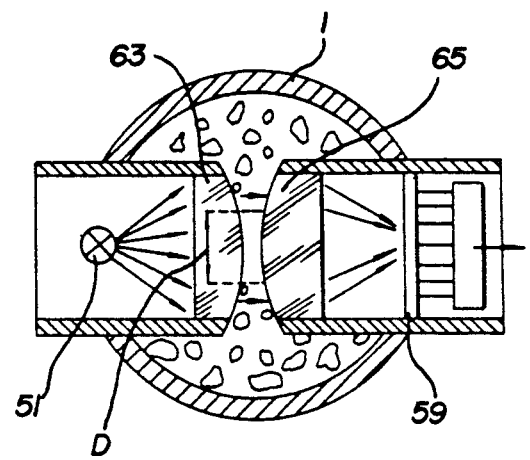
FIG. 3 shows a schematic view of another embodiment of the floc measuring device.

In the embodiment of the floc-measuring device shown in FIG. 3, two measuring tubes which are each terminated by a spherical lens 63 and 65 are inserted into the wall of the suspension line 1. These tubes project into the tube cross-section to the extent that the spherical outer surfaces of the lenses 63 and 65 face one another forming a narrow gap. The gap width at the vertex of the lenses is smaller than the smallest floc size which is to be recorded using the measurement device. The lens 63 collimates the light from the light source 51 into a light bundle which is directed into the suspension, and the lens 65 images the sludge flocs located between the lenses onto the receiver 59 in transmitted light; the latter may likewise, for example, be designed as a matrix of pixel sensors.

The suspension in the line 1 flows perpendicularly to the plane of the drawing. The flocs can only come between the lenses 63 and 65 to the extent that their size permits. A central region of diameter D of the field of view covered by the lenses 63 and 65 thus remains free of flocs and appears on this receiver 59 as a floc-free white field. The diameter D of this free field is a direct measure of the floc size. Of course, the gap used to determine the floc size can be produced by other means, for example as a wedge-shaped gap between two flat glass plates.

Additional reference detectors can be provided in order to determine the total amount of light scattered by the flocs and to correspondingly adjust the light source 51. The signal detected by the receiver 59 is then not dependent on the total amount of flocs.

Using the apparatus shown schematically in FIG. 1, the process according to the invention is preferably carried out in the following way: in the controller 41 or the connected computer 43 are stored data which describe the optimum floc size for dewaterability for a large number of types of suspension or sludge to be processed. These data have previously been determined in separate measurement series. On operation of the plant, the data are in each case called up which belong to the suspension which is about to be processed. The measurement signal coming from the optical sludge probe 15 is compared with these data. This can take place, in particular, periodically, e.g. every 0.8 seconds. If this measurement signal does not correspond to the optimum floc size, the amount of admixed flocculant is increased by the controller through adjustment of the mixing valve 27 and/or the metering pump 35. The consequence of this is a change in the shape of the floc size determined by the probe 15, and this is reported back again to the controller 41, giving rise to a feedback control loop. Instead of or in addition to the amount of flocculant, the incorporation energy can also be changed by adjusting the baffles 47 of the turbulence mixer 13, which likewise has the consequence of a change in the floc size. Program which in each case determine the priority of control of the amount of flocculant or the incorporation energy can be stored in the controller 41 or in the computer 43. In particular, this program can be designed so that it recognizes automatically whether a certain increase in the amount of flocculant leads to an adequate improvement in the floc size, and, if this is not the case, terminates further increase in the amount of flocculant and instead alters the incorporation energy in the turbulence mixer 13. Thus, through simultaneous or programmed alternating change of the amount of flocculant and the incorporation energy, the respective optimum can be determined and constantly adjusted.

The floc size is also influenced by the location of addition of the flocculant on the vacuum side of the pump 3 at 9 or on its pressure side at 11. Pressure-side addition at 11 has the advantage that the sludge flocs are not broken down in the pump 3, but it has become apparent in practice that although admixing on the vacuum side of the pump does not lead to an entirely ideal floc size, the floc size is, however, subject to less variation. By switching between the two admixing locations 9 and 11 by means of the switching valve 39, an additional optimization influence can be exerted with control by the controller 41.

A further criterion for sludge conditioning is the pressure which prevails at the inlet to the filter press 5 and which increases considerably over the course of a filtration batch, the flow rate of the suspension simultaneously decreasing correspondingly, e.g. from 40 m/sec initially to about 3 m/sec at the end of the filtration batch. The optimum settings for flocculant addition, the turbulence mixer 13 and also the addition location at 9 or 11 also change corresponding to this change in pressure in the flow rate. The controller 41 can therefore also control, for example, the setting of the baffles 47 and/or the switching valve 39 as a function of the pressure measured by the pressure gauge 19 and/or of the suspension throughout measured by the flow meter 7.

Figure 4A:
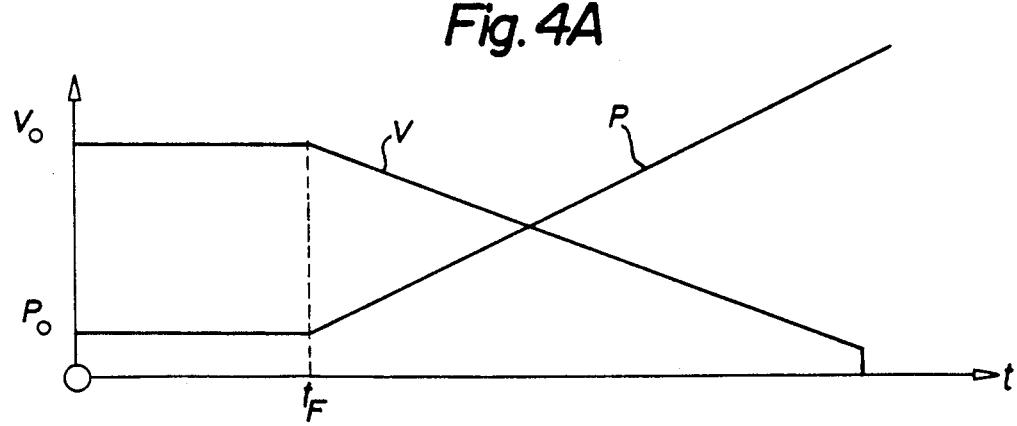
FIG. 4 shows schematic time diagrams for illustration of the control of the amount of flocculant.
Figure 4B:
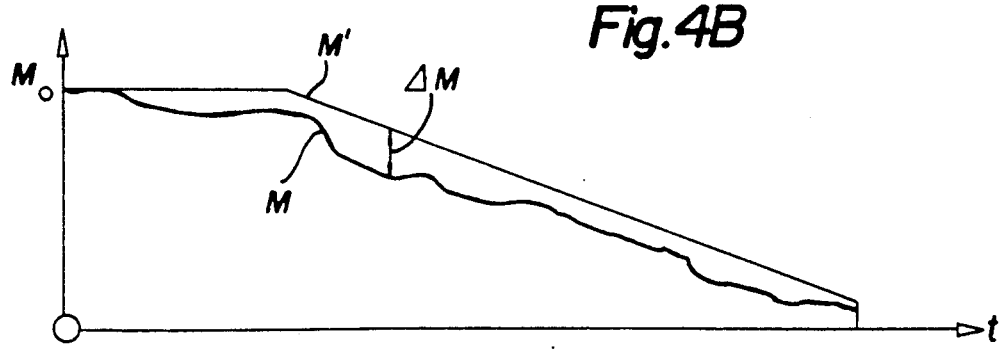

In FIG. 4, curves V and P illustrate a typical, schematic course of the amount of suspension V and the charging pressure P on filling a filter press. On commencement of charging, the empty chambers of the filter press are initially filled, so that, to a point in time $t_F$, the amount $V_0$ flowing per time unit and the charging pressure $P_O$ remain essentially constant. When the press is filled at time $t_F$, the filtrate must now be forced through the filter cloths, filter cakes increasingly depositing on the filter cloths and the flow resistance increasing. This causes the flow rate V to decrease continuously and the charging pressure P to be applied to be increased continuously. For reasons of simplicity, this decrease and increase is shown as linear in FIG. 4, but it may alternatively, of course, not be a linear function of time.

Depending on the amount of suspension V or the pressure P, the amount M of flocculant added per time unit can now be controlled approximately, giving the curve M' starting from an initial amount $M_O$. However, the controller 41 simultaneously causes, as a function of the floc size determined by the measuring probe 15, constant correction of the amount of flocculant by a difference $\Delta M$, which is preferably applied as a negative value. This gives the final control curve M for the amount of flocculant, which is both matched to the suspension flow rate, which decreases during the dewatering process, and controlled in the interest of optimum floc formation.

In a similar fashion, the mixing energy can be controlled approximately by adjusting the baffles 47, initially as a function of the amount of suspension or the charging pressure of the filter press, and, if necessary, a correction regulation can take place with reference to the floc size determined by the measuring probe 15.

I claim:

1. A process for conditioning and dewatering sludge, in which process a flocculant is added to the sludge to be dewatered and the flocculant is mixed with the sludge while employing mixing energy, comprising the steps of;
   continuously or periodically measuring the size and/or structure of the flocs present in the sludge after addition of the flocculant,
   comparing the measurement signal with a large number of stored nominal values which correspond to the floc sizes and structures which are optimum for the dewatering process for various sludge types, and selecting therefrom the nominal value belonging to the sludge type of the sludge being measured,
   adjusting as a function of said measuring, comparing and selecting steps at least one conditioning parameter selected from the amount of added flocculant, the mixing energy and the location of addition of the flocculant,
   and following said conditioning step, dewatering the sludge by a process which applies a force to the sludge to cause the liquid to separate from the solids content of the sludge.

2. A process according to claim 1, wherein the floc measurement step is accomplished through optical measurement in the flowing sludge.

3. A process according to claim 1, wherein, in the case of a deviation from the nominal value, one of the conditioning parameters is initially adjusted in a limited range and adjustment of other conditioning parameters is done only thereafter.

4. A process according to claim 1, further comprising the step of determining either directly or indirectly the amount of sludge flowing per unit of time, and wherein the conditioning parameter is primarily adjusted as a function of the amount of sludge flowing per unit of time, and overlaid by the floc measurement-dependent adjustment as a correction.

5. A process according to claim 1, wherein the dewatering process comprises pressing the sludge in a filter press.

6. A process for conditioning sludge prior to dewatering thereof, comprising the steps of:
   adding a flocculant to the sludge,
   measuring the size and/or structure of the flocs present in the sludge by a procedure which directly optically senses the size and/or structure of individual flocs of the sludge,
   comparing the results of the measuring step with a large number of stored nominal values which correspond to the floc sizes and structures which are optimum for the dewatering process for various sludge types,
   selecting from said nominal values that nominal value belonging to the sludge type of the sludge being measured, and in direct response to said measuring, comparing and selecting steps, adjusting parameters which influence the total distribution and application of the flocculant and the floc formation, and
   dewatering the sludge by a process which applies a force to the sludge to cause the liquid to separate from the solids content of the sludge.

7. A process according to claim 6, wherein the dewatering process comprises pressing the sludge in a filter press.

* * * * *